United States Patent [19]

Smith

[11] Patent Number: 4,858,363
[45] Date of Patent: Aug. 22, 1989

[54] CRAYFISH HARVESTER

[76] Inventor: John S. Smith, P.O. Box 8, Jennings, La. 70546

[21] Appl. No.: 286,276

[22] Filed: Dec. 19, 1988

[51] Int. Cl.⁴ ............................................. A01K 80/00
[52] U.S. Cl. ....................................... 43/6.5; 43/27.4; 43/100; 37/55; 56/9; 119/2
[58] Field of Search ...................... 43/4, 4.5, 6.5, 100, 43/27.4; 119/2; 37/55, 119; 56/8, 9

[56] References Cited

U.S. PATENT DOCUMENTS

| | | | |
|---|---|---|---|
| 578,248 | 3/1897 | Layne | 43/27.4 |
| 4,434,572 | 3/1984 | Sheldon et al. | 56/9 |
| 4,449,479 | 5/1984 | Saucier | 119/2 |
| 4,554,759 | 11/1985 | Edling et al. | 43/100 |
| 4,563,830 | 1/1986 | Cain, Jr. et al. | 43/4.5 |

*Primary Examiner*—Nicholas P. Godici
*Assistant Examiner*—William Scott Andes
*Attorney, Agent, or Firm*—William David Kiesel; Robert C. Tucker

[57] ABSTRACT

An apparatus for harvesting crayfish and similar crustaceans from ponds utilizing a hollow tube placed in the pond and provided with openings sized to allow crayfish to enter the hollow tube where they are pushed through the tube by the action of a plug being moved through the tube.

11 Claims, 3 Drawing Sheets

CRAYFISH HARVESTER

BACKGROUND OF THE INVENTION

1. Field of the Invention

This invention relates to crayfish and similar crustaceans, and more particularly to apparatus for harvesting crayfish from ponds.

2. Prior Art

Crayfish have long been considered a delicacy in the Scandinavian countries, France and in parts of the United States. The traditional method of harvesting crayfish was through the use of underwater wire mesh traps set out in bodies of shallow water which crayfish naturally inhabited.

With the increased popularity of crayfish as an edible food the supply of crayfish from natural habitats was neither stable enough nor plentiful enough. This led to the development of artificial ponds used to raise crayfish, and the need to develop methods and apparatus for easily, quickly and cheaply harvesting the crayfish from these ponds.

Examples of some of the newer methods and devices to harvest crayfish are disclosed in the following U.S. Pat. Nos. 4,449,479 issued on May 22, 1984 to Howard J. Saucier and entitled "Crayfish Harvesting, Sheltering and Spacing Apparatus"; 4,554,759 issued on Nov. 26, 1985 to Robert J. Edling et al and entitled "Method and Means for Harvesting Crayfish"; and 4,563,830 issued on Jan. 14, 1986 to C. Dean Cain et al and entitled "Process & Apparatus for Harvesting Soft Shell Crayfish".

Despite the extensive research that has been conducted both in the United States and abroad there still remains the problem of finding a less labor intensive method and apparatus for harvesting of crayfish, particularly crayfish raised in man-made ponds.

SUMMARY OF THE INVENTION

Therefore it is an object of this invention to provide apparatus which can be used to harvest crayfish from both natural bodies of water and man-made ponds.

Another object of this invention is to provide apparatus which can efficiently harvest crayfish with the least amount of physical damage to the crayfish.

Still another object of this invention is to provide apparatus for harvesting crayfish which is not labor intensive.

Still a further object of this invention is to provide apparatus for harvesting crayfish that is simple in construction and operation.

Other objects and advantages of the invention will be apparent from the ensuing descriptions of the invention.

Accordingly, an apparatus for harvesting crayfish is provided comprising an elongated hollow tube having a series of opening in its exterior surface opening into the tube's passageway, each opening being sized to allow crayfish to enter the passageway from the outside of the tube, a plug means located inside the passageway and being sized so that as it is moved through the passageway by a second means it forces the crayfish through the passageway and out through one end of the tube where the crayfish are dumped into a container.

PREFERRED EMBODIMENTS OF THE INVENTION

Figure 1:
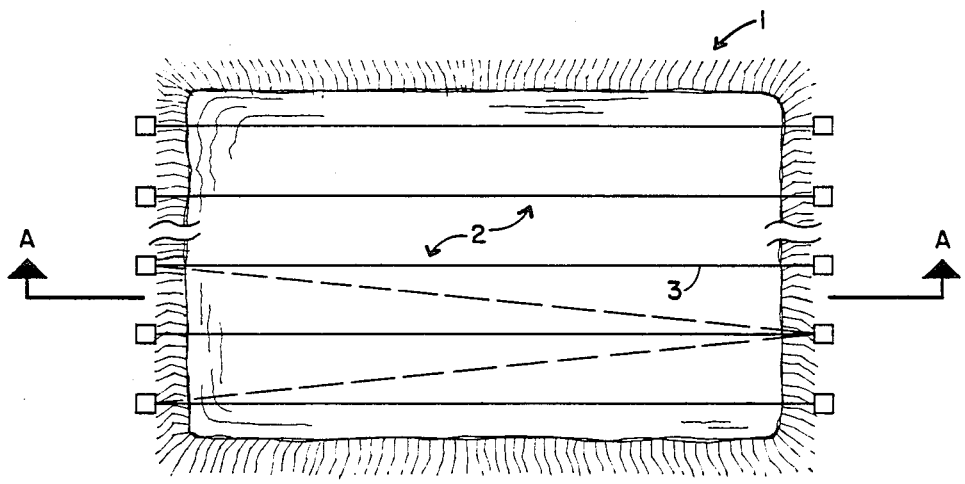
FIG. 1 is a top view of a preferred embodiment of the invention shown in a typical crayfish pond configuration.

Referring now to FIG. 1 a typical man-made crayfish pond 1 is shown wherein a series of the crayfish harvesting assemblies, denoted generally by the numeral 2, have been positioned in pond 1.

A typical pond will be 50 to 250 acres in size and generally rectangular in shape. The hollow tubes 3 which form part of assemblies 2 can be positioned in any manner in pond 1, but it is preferred that they be positioned parallel to one another as the configuration most efficient in harvesting the crayfish. Although there is no theoretical limitation as to the length of tubes 3, it is preferred that the length be less than 300 feet to facilitate pulling a plug means through the passageway of tube 2 at a reasonable rate without damage to the crayfish.

Figure 2:
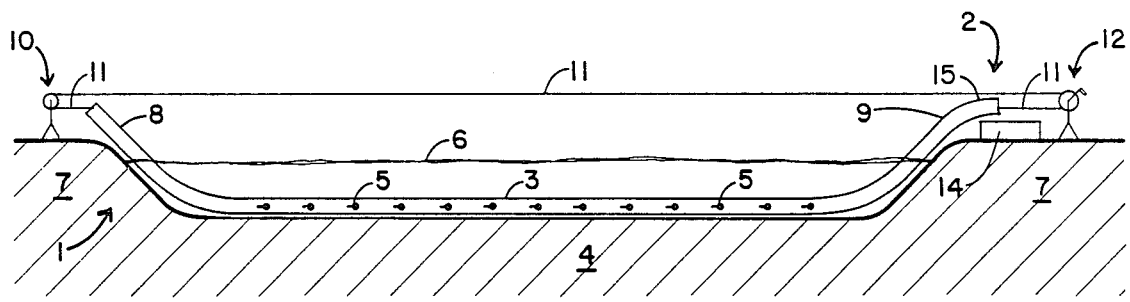
FIG. 2 is a side view taken along lines A-A of FIG. 1 of one preferred embodiment of the invention in the crayfish pond.
Figure 3:
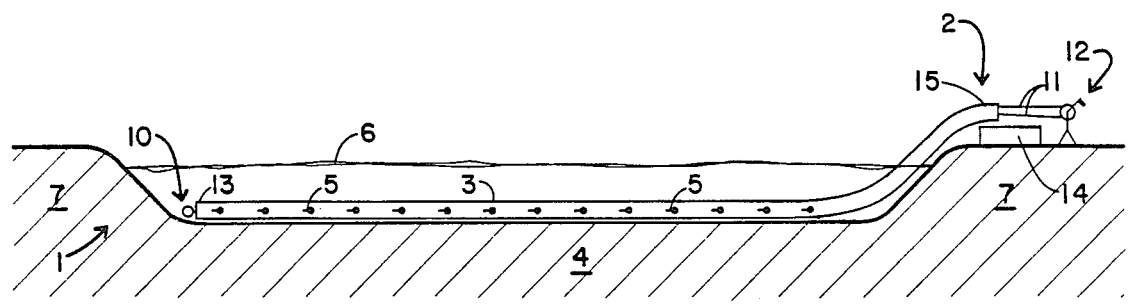
FIG. 3 is a side view of an alternate preferred embodiment of the invention in a crayfish pond illustrated in FIG. 2.

FIGS. 2 and 3 disclose alternate preferred embodiments of the tube configuration and mechanisms for pulling the plug means through the tube 3. In these embodiments tube 3 is positioned on the bottom 4 of pond 1 whereby a series of openings 5 lie above bottom 4 in position to allow crayfish that are on the bottom 4 to easily enter the openings 5. At least one end of tube 3 extends above water surface 6 and over pond bank 7.

In FIG. 2 both ends 8 and 9 of tube 3 extend above surface 6 and over pond bank 7. At end 8 a pulley assembly 10 is positioned to receive line 11 extending through tube 3. At end 9 a cranking assembly 12 is positioned to receive the other end of line 11. Thus line 11 is operatively connected to pulley assembly 10 and cranking assembly 12 to allow it to be moved back and forth in tube 3. In FIG. 3 pulley assembly 10 is attached directly to tube end section 13 beneath surface 6 as shown. In both embodiments a basket 14 is placed beneath tube end section 15 to catch crayfish as they are forced through tube 3 as explained below.

Figure 4:
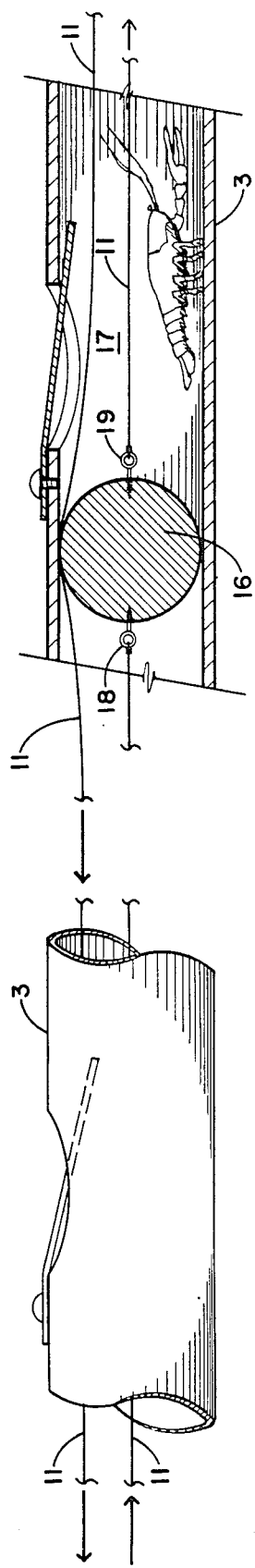
FIG. 4 is a cross-sectional view of a ball-shaped plug device that can be used as part of the invention.
Figure 5:
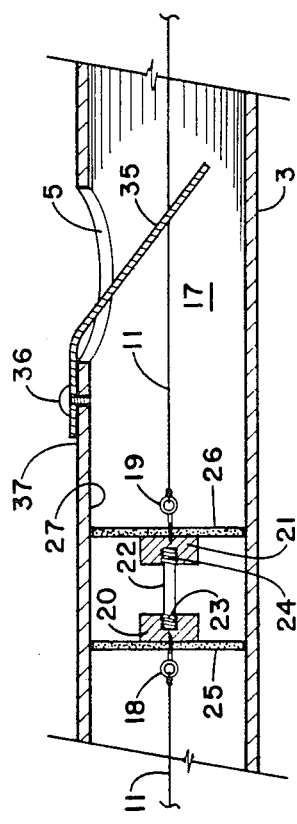
FIG. 5 is a cross-sectional view of a parallel disc-shaped plug device that can be used as part of the invention.
Figure 6:
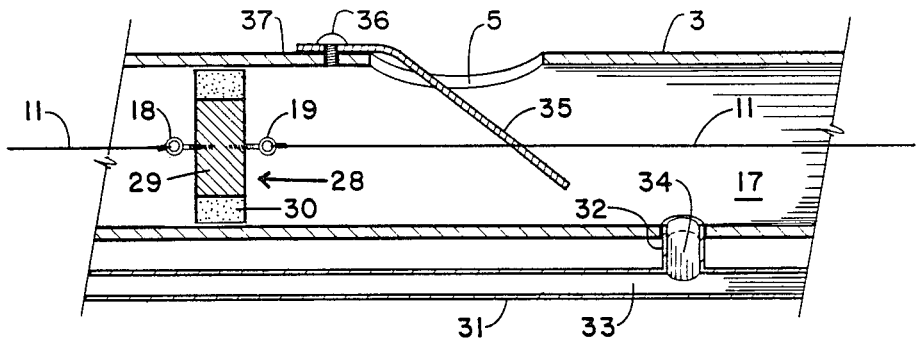
FIG. 6 is a cross-sectional view of an alternate preferred disc-shaped plug device that can be used as part of the invention and illustrating an automatic crayfish food supply line.

Alternate preferred embodiments of the plug means 16 used to force crayfish through the tube passageway 17 are illustrated in FIGS. 4 through 6. In FIG. 4 the plug means 16 comprises a plastic or rubber ball to which line 11 is attached to eyelets 18 and 19 that have been screwed into or otherwise fixedly attached at opposite points on ball 16. More particularly one end of line 11 is attached to eyelet 18 and the other end is extended around the pulley of pulley assembly 10, such as seen in FIG. 3, and looped back through passageway 17 where it passes over the top of the ball and operatively about cranking assembly 12 before passing back into passageway 17 where it is attached to eyelet 19.

In a more preferred embodiment plug means 16 will be constructed utilizing parallel discs (FIG. 5) or a single disc (FIG. 6) in order to minimize the damage to the crayfish as they are forced through passageway 17 as explained below. In the FIG. 5 embodiment two rigid plates 20 and 21 are attached to one another in parallel configuration by threaded rod 22 which screws into threaded plate openings 23 and 24 as shown. Attached respectively to each plate 20 and 21 is a rubber or similarly flexible disc 25 and 26. Discs 25 and 26 are sized so that their perimeter edges are adjacent or in contact with inner tube surface 27. In a preferred embodiment both the passageway and the discs are circular in shape.

Alternately as shown in FIG. 6 there can be a single disc 28 of dual durometer construction whereby the inner section 29 is of a rigid composition and the outer perimeter section 30 is of flexible composition. This allows eyelets 18 and 19 to be attached to the rigid inner section 29.

In another preferred embodiment bait is automatically feed into passageway 17 to attract the crayfish by introducing the bait into one end of hollow tube 31 which runs parallel to tube 3 and is connected by hollow tubular sections 32 that allow the bait to flow through passageways 33 and 34 and into passageway 17. In a more prefered embodiment there will be a connecting tubular section 32 located near each opening 5.

Figure 7:
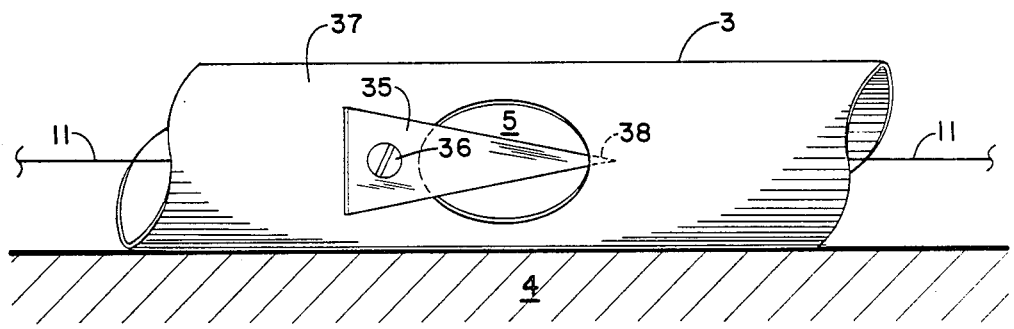
FIG. 7 is a top view of a preferred embodiment of the flap that can be used as part of the invention attached to the hollow tube.

As shown in FIG. 7 it is preferred that a flap 35 be attached by staples or by screw 36 to the outer surface 37 of tube 3 in a position to extend over opening 5. More preferably flap 35 will be triangular in shape and of sufficient length so that the tip end 38 can extend into passageway 17 and beneath inner tube surface 27. In a still more preferred embodiment flap 35 will be constructed from semi-rigid material such as polyethylene, preferably having a thickness of about 0.035 inches, that will flex inward when a crayfish attempts to enter passageway 17 through opening 5, but will block opening 5 so that the crayfish are not forced through opening 5 when plug means 16 is moved through passageway 17 as discussed below.

Figure 8:
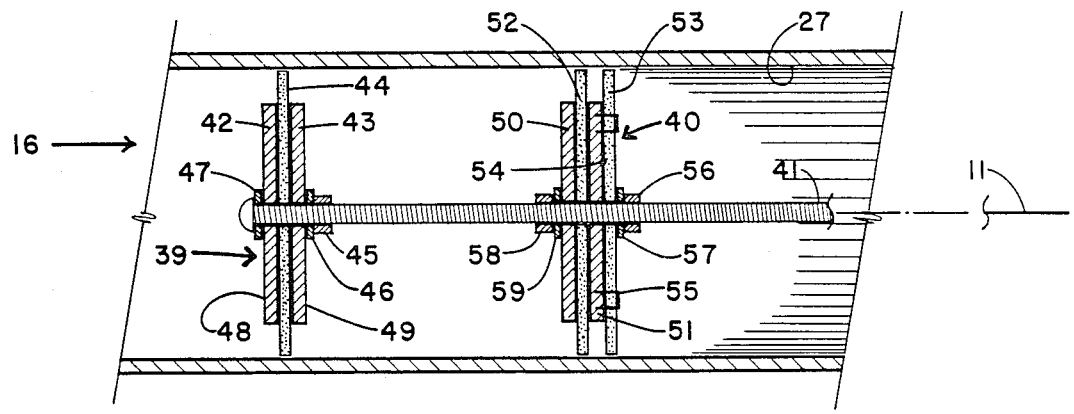
FIG. 8 is a cross-sectional view of a preferred parallel disc-shaped plug device that can be used as part of the invention.

A more preferred embodiment of plug means 16 is illustrated in FIG. 8. In that embodiment the plug means 16 comprises a rear disc assembly 39 and a forward disc assembly 40 positioned parallel to one another by an elongated threaded bolt 41 or similar means.

The rear disc assembly comprises parallel rigid discs 42 and 43 which sandwich a flexible disc 44. These three discs are held in position by passing threaded bolt 41 through center openings in each disc and then by tightening nut 45 against washer 46 the three discs are squeezed together by the tightening of washer 47 and washer 46 against the outer surfaces 48 and 49 of discs 42 and 43, respectively. In this embodiment flexible disc 44 is of sufficient diameter to contact inner tube surface 27 and more preferably is constructed from polyethylene or similar material having a thickness of about 0.035 inches.

The front disc assembly 40 like rear disc assembly 39 comprises parallel rigid discs 50 and 51 which sandwich flexible disc 52. The front disc assembly 40 differs in that a second flexible disc 53 is fixedly attached to the front surface 54 of rigid disc 51 by staples 55 or similar means. These four discs are held in position separate but parallel to the three rear disc assembly discs 42, 43 and 44 by tightening nut 56 against washer 57 whose horizontal movement is restricted by nut 58 and washer 59 positioned against disc 50. In this embodiment both flexible discs 52 and 53 contact inner tube surface 27 and are also preferably constructed of polyethylene or similar material having a thickness of 0.035 inches.

In operation tubes 3 will be positioned on the bottom 4 of pond 1 and bait will be placed in passageway 17 adjacent openings 5 in order to attract crayfish. As the crayfish enter passageway 17 through openings 5 they push flap 35 down to create sufficient room for them to enter. The crayfish enter passageway 17 and move toward the bait. At predetermined time intervals cranking assembly 12 is activated causing line 11 to be drawn toward cranking assembly 12. This causes plug means 16 to move down passageway 17. This action forces the water inside of passageway 17 to also move toward cranking assembly 12. A portion of this water will exit openings 5 so as to require less force to move the plug means 16 down passageway 17. Thus, the combination of moving water and moving plug means 16 forces the crayfish to move toward cranking assembly 12. It has been found that as a result of the moving water that little or no damage occurs to the crayfish during this cranking process. This is particularly true when utilizing the disc shaped plug means shown in FIG. 8. The plug means 16 is cranked to the position necessary to force the crayfish inside passageway 17 to exit tube end section 15 and fall into basket 14. The plug means 16 is then cranked in the opposite direction until it is repositioned near tube end section 13. This process is then repeated as often as desired.

From the disclosures above there are of course many alternate embodiments which are obvious and are intended to be included in the scope of this invention as defined in the following claims.

What I claim is:

1. An apparatus for harvesting crayfish or similar crustaceans from a body of water which comprises:
    (a) a hollow tube positioned adjacent to the bottom of said body of water, said tube having a series of openings in its exterior wall surface connecting to the hollow passageway of said tube, said openings having a shape and positioned to permit crayfish to pass through said openings and into said passageway,
    (b) a plug means positioned in said passageway, said plug means having an outer perimeter area shaped to be adjacent to the inner wall surface of said tube, and
    (c) a second means attached to said plug means to move said plug means through said passageway.

2. An apparatus according to claim 1 wherein a flap is attached at one end to the outer wall surface of said tube and positioned across each of said openings with its opposite end positioned beneath the inner wall surface of said tube and constructed of resilient material having sufficient flexibility to be pushed into said passageway by said crayfish.

3. An apparatus according to claim 2 wherein one end of said flap is constructed from polyethylene having a thickness of about 0.035 inches.

4. An apparatus according to claim 2 wherein said flap is triangular in shape and positioned with one of its apex ends extending beneath said inner wall surface.

5. An apparatus according to claim 1 wherein said passageway is circular in cross-section.

6. An apparatus according to claim 5 wherein said plug means comprises a ball.

7. An apparatus according to claim 5 wherein said plug means comprises a disc having a perimeter area constructed of flexible material that extends toward said inner wall surface of said tube.

8. An apparatus according to claim 5 wherein said plug means comprises parallel separated disks attached to one another, each of said disks having a perimeter area constructed of flexible material that extend toward said inner wall surface of said tube.

9. An apparatus according to claim 1 wherein said second means comprises a line attached at one end to said plug means and extending through said passageway and operatively attached at its other end to a first cranking assembly.

10. An apparatus according to claim 9 wherein said second means further comprises a second line attached at one end to said plug means and extending through said passageway in a direction opposite said first line and operatively attached at its other end to a second cranking assembly.

11. An apparatus according to claim 1 wherein said second means comprises a line attached at one end to said plug means and extending through said passageway where it is looped around a first pulley assembly and extends back through said passageway to loop around a second pulley assembly positioned at the opposite end of said tube than said first pulley assembly and then extending back into said passageway where said line's opposite end is attached to said plug means, and a third means operatively attached to said line to move it through said passageway.

* * * * *